Figure 1:
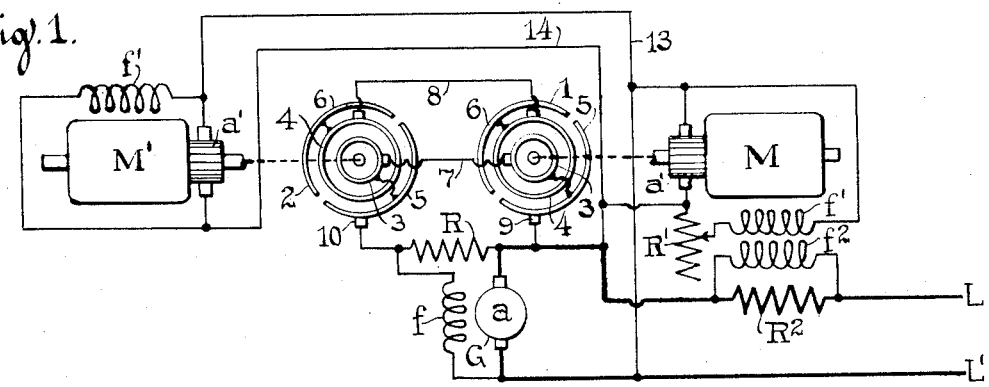

F. L. RE QUA.
REGULATING SYSTEM.
APPLICATION FILED APR. 7, 1919.

1,431,254.

Patented Oct. 10, 1922.

INVENTOR.
Frederick L. Re Qua
BY
ATTORNEY

Patented Oct. 10, 1922.

1,431,254

UNITED STATES PATENT OFFICE.

FREDERICK L. RE QUA, OF MILWAUKEE, WISCONSIN, ASSIGNOR TO THE CUTLER-HAMMER MFG. CO., OF MILWAUKEE, WISCONSIN, A CORPORATION OF WISCONSIN.

REGULATING SYSTEM.

Application filed April 7, 1919. Serial No. 288,057.

*To all whom it may concern:*

Be it known that I, FREDERICK L. RE QUA, a citizen of the United States, residing at Milwaukee, in the county of Milwaukee and State of Wisconsin, have invented new and useful Improvements in Regulating Systems, of which the following is a full, clear, concise, and exact description, reference being had to the accompanying drawing, forming a part of this specification.

This invention relates to electric regulating systems and particularly to systems of generator regulation, although certain features of the invention have various other advantageous applications.

Further, the invention relates to systems of regulation including regulating means for effecting rapid response of the controlled element to changes in voltage or current, as the case may be, for close regulation of the dynamo electric machine or electric circuit to be controlled.

An object of the invention is to provide efficient and reliable regulating means of the aforesaid character capable of effecting more rapid response of the controlled element and hence affording closer regulation than heretofore obtained.

Another object is to provide rugged and durable regulating means of the aforesaid character capable of ready adjustment for different levels of regulation and also readily controllable for adjustment thereof automatically.

Various other objects and advantages of the invention will hereinafter appear.

According to the present invention, it is proposed to make and break an electric circuit by co-operating contact devices mechanically constructed and co-ordinated to make and break circuit throughout varying periods and by unidirectional rotation of one or more of the elements thereof whereby the aforesaid periods may be curtailed without regard to the voltage or current of said circuit and without other limitations encountered in vibrating relays. Further, it is proposed to provide such contact devices with controlling means whereby the action thereof is governed by the electrical conditions existing in the dynamo-electric machine or electric circuit of which regulation is desired.

The accompanying drawing illustrates certain embodiments of the invention and the same will now be described, it being understood that the invention is susceptible of embodiment in other forms for accomplishment of the same and other results without departing from the scope of the appended claims.

Figure 2:
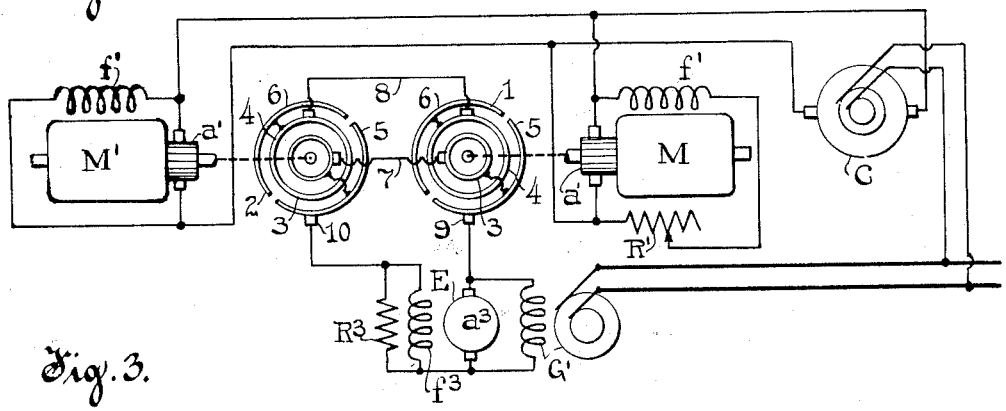
Figure 3:
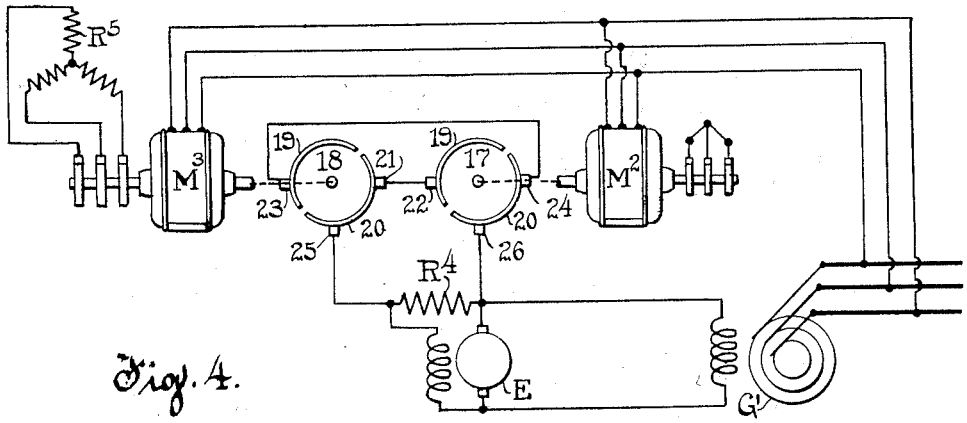
Figure 4:
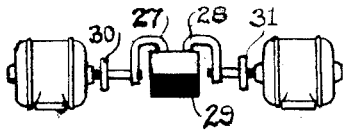

In the drawing,

Figure 1 diagrammatically illustrates a system of regulation for a direct current generator;

Fig. 2 diagrammatically illustrates a system of regulation for an alternating current generator;

Fig. 3 diagrammatically illustrates a modified regulating system for an alternating current generator; and, Fig. 4 diagrammatically illustrates a modification of the regulating medium.

Referring to Fig. 1, the same shows a generator G having an armature $a$ and a shunt field $f$, said generator supplying a circuit L, L' and being regulable for a constant voltage output by means including a field resistance R. Regulation of the generator is effected by making and breaking a short circuit around said field resistance by the means now to be described.

The means for controlling the short circuit for the resistance R includes commutators 1 and 2 respectively driven by motors M and M' it being understood that various different types of commutators and motors may be employed. As shown, the commutators are of like construction, each comprising concentric ring contacts 3 and 4 and insulated segments 5 and 6, said segments being of equal length and being respectively connected to the rings 3 and 4. The two commutators have their rings 3 interconnected through suitable brushes and a cross connector 7 and their rings 4 interconnected through suitable brushes and a cross connector 8. Further, said commutators are respectively provided with fixed brushes 9 and 10 to engage their segments 5 and 6, said brushes being connected to opposite terminals of resistance R whereby said commutators serve to establish the short circuit around said resistance, when said brushes engage like segments on the two commutators. On the other hand, when said brushes engage dissimilar segments on the commutators, said short circuit is interrupted. Thus it will be apparent that the commutators are rotatable unidirectionally to successively make and break the short circuit for varying periods determined by the relation of said commutators with respect to the brushes, said commutators being relatively adjustable for continuous variation of said periods between extreme limits, i. e., continuous completion and continuous interruption of said short circuit. Further, it will be apparent that since the commutator brushes 9 and 10 are fixed, operation of the commutators unidirectionally insures a wide separation of contacts for interruption of the short circuit whereby the aforesaid periods may be reduced to any desired minimum regardless of the voltage and current of the controlled circuit and without any problem of inertia such as must be dealt with in the case of vibrating relays. As will be understood, the regulation afforded the generator varies with the ratio between the periods of time during which the short circuit is made and broken and that the means described provides for an increased variation in such ratio with the result of enabling closer regulation than has heretofore been obtainable.

The motors M and M' are provided with armatures $a'$ and shunt field windings $f'$, said windings of both motors being connected by conductors 13 and 14 across the circuit L—L' supplied by the generator. Thus both motors are subjected to variations in the voltage supplied by the generator and the motor M' is designed to operate at a speed variable with the generator voltage while motor M is designed to operate at a substantially constant speed irrespective of variations in the generator voltage. More specifically, the motor M' is so designed that its field operates well over the bend of the saturation curve so that changes in the generator voltage do not materially change the value of the field flux whereby the speed of said motor is rendered approximately proportional to the generator voltage. On the other hand, the motor M is so designed that its field operates on the straight line portion of the saturation curve so that changes in the terminal voltage do not materially change the value of the quotient of armature voltage divided by field flux, with the result that the speed of said motor remains substantially constant. Further, the motor M is provided with a field rheostat R' for adjusting its speed as desired and with an auxiliary field winding $f^2$ connected across the terminals of a resistance $R^2$ in series in the circuit L—L', said auxiliary field being provided to oppose the field winding $f'$ as hereinafter set forth and its use being purely optional.

Thus in operation the motor M establishes a standard of regulation and whenever the generator voltage varies from the standard thus established, with a consequent variation in speed of motor M', the relation of the commutators driven by said motors is changed to vary the field strength of the generator for correction of the voltage variation. The system so functions regardless of whether or not the motor M is provided with the aforesaid auxiliary field winding and it is to be noted that different degrees of voltage variation effect proportional instantaneous changes in the speed ratio of the motors and accordingly in the speed ratio of the commutators with the result of correspondingly varying the ratio of the periods during which circuit is made and broken. Thus since the commutators are capable of curtailing such periods as above described, it will be apparent that they provide for exceedingly close regulation of the generator voltage. The auxiliary field $f^2$ of motor M being connected as described, the same is subjected to the influence of variations in the load of circuit L—L', and functions to weaken the field of said motor as the current of said circuit is increased, and vice versa. Thus said auxiliary field winding provides for automatic variation of the level of regulation for different loads and it is to be understood that said winding may be employed to assist the field winding $f'$, if desired.

While in Fig. 1 the commutators are shown as effecting regulation of the generator by making and breaking the short circuit of a field resistance, it is to be understood that they may be employed to effect regulation of said generator in other ways, as for example, that depicted in Fig. 2. Also, it is to be understood that the commutators described may be replaced by any of the other forms of commutating devices hereinafter described.

Referring to Fig. 2, the same shows an alternating current generator G', an exciter E for supplying the field of said generator, motor driven commutators identical with those shown in Fig. 1, for regulating the field strength of the exciter but in a slightly different manner from that above described, and a rotary converter C operating upon current supplied by the generator G' to supply direct current to the motors M and M' of the regulating means. In this instance the commutators control the continuity of circuit of the field $f^3$ of the exciter, said field being shunted through a resistance or condenser $R^3$ as preferred. More specifically, the brush 9 of commutator 1 is connected to one terminal of the armature $a^3$ of the exciter while brush 10 of commutator 2 is connected to one terminal of the field $f^3$ of the exciter. Accordingly the circuit of said field is completed so long as said brushes engage like segments of the commutators whereas said circuit is interrupted for discharge of the field through resistance R³ when said brushes engage dissimilar segments of the commutators as the result of a variation in the relative speeds of motors M and M'. Such interruption of the circuit of the exciter field effects regulation similar to that effected by the resistance shown in Fig. 1 and it is to be understood that the exciter field may be controlled as shown in Fig. 1, if preferred.

Referring to Fig. 3, the same shows an alternating current generator G' and exciter E similar to those shown in Fig. 2 but provided with modified regulating means obviating the necessity for the rotary converter of Fig. 2. In this instance the field of the exciter is controlled through the medium of a resistance R⁴ as in the case of the generator of Fig. 1 said resistance being provided with a short circuit controllable by commutators 17 and 18 driven by alternating current motors M² and M³ supplied by the generators G'. The commutators are of a simplified form, merely comprising contact segments 19 and 20 similar to the segments 5 and 6 of the commutators of Fig. 1, being in this instance provided with brushes 21—22, 23—24 and 25—26. The brushes 25 and 26 are connected to opposite terminals of the resistance R⁴ and arranged as in Fig. 1 whereas the brushes 21—22 and 23—24 are electrically connected to complete the short circuit for the resistance when the brushes 25 and 26 engage the commutator segments which are at the instant electrically connected by the former brush. Accordingly the commutators function similarly to the commutators of Fig. 1 although they effect the full range of adjustments by an angular displacement materially less than that required of the former commutators. Both motors are of the induction type, the motor M² having its rotor windings short circuited whereby the speed of said motor is maintained substantially constant irrespective of variations in the generator voltage, whereas the motor M³ has resistance R⁵ included in its rotor circuit to render the speed of said motor variable with the generator voltage.

Referring to Fig. 4, the same shows a further modification of the regulating means. In this instance the motors drive rotating brushes 27 and 28 co-operating with a stationary commutator 29 of two or more segments. The brushes are provided with slip rings 30 and 31 respectively for connection to opposite terminals of a regulating resistance as in Figs. 1 and 3 or to the armature and field terminals as in Fig. 2 and when said brushes engage the same commutator segment they complete the controlled circuit. However, a difference in the speeds of the motors varies the angle between the brushes and as they rotate about the commutator they make and break the controlled circuit for periods varying with the angle between the same, to effect regulation as above described.

What I claim as new and desire to secure by Letters Patent is:

1. In combination, a generator, and regulating means therefor including a device having parts to be separately driven at speeds variable with certain of the components of the output of said generator, said device functioning to make and break a circuit for periods varying with the angular relation of said parts.

2. In combination, a generator and regulating means therefor including a device having a contact part to be driven at a speed variable by certain of the components of the output of said generator and a contact part to be driven at a speed unaffected by variations in such components, said device functioning to make and break a circuit for periods varying with the angular relation of said contact parts.

3. In a system of regulation, in combination, a circuit subject to electrical variations, a plurality of dynamo electric machines whose speed ratio is variable with certain of such electrical variations of said circuit and co-operating contact devices controlled by said machines to make and break an electric circuit by unidirectional operation of certain of their contact elements and for periods varying with the angular relation of said machines.

4. In a system of regulation, in combination, a circuit subject to electrical variations, a plurality of dynamo electric machines supplied from said circuit, one of said machines operating at a speed influenced by certain of said electrical variations and another of said machines being operable at a speed substantially independent of such variations and co-operating contact devices controlled by said means to make and break an electric circuit by unidirectional movement of certain of its contact elements and for periods varying with the angular relation of said machines.

5. The combination with a generator, of regulating means therefor including a plurality of dynamo electric machines similarly connected in a circuit supplied by said generator and affording regulation variable by variations in the speed ratio of said machines, one of said machines operating at a substantially constant speed and another of said machines operating at a speed variable by variations in the output of said generator.

6. The combination with a generator, of regulating means therefor including a plurality of dynamo electric machines similarly connected in a circuit supplied by said generator and affording regulation variable by variations in the speed ratio of said machines, one of said machines operating at a speed variable by variations in certain of the components of the output of said generator but being unaffected by variations in other of the components of the generator output and another of said machines operating at a speed substantially independent of the variations in generator output which affect the speed of the former machine.

7. The combination with a generator, of regulating means therefor including a plurality of dynamo electric machines similarly connected in a circuit supplied by said generator and affording regulation variable by variations in the speed ratio of said machines to maintain a substantially constant voltage output of said generator, one of said machines operating at a speed substantially independent of variations in the voltage output of said generator and the other operating at a speed varying with such voltage variations.

8. The combination with a generator, of regulating means therefor including a plurality of dynamo electric machines similarly connected in a circuit supplied by said generator and effecting regulation variable by variations in the speed ratio of said machines to maintain a substantially constant voltage output of said generator, one of said machines operating at a speed variable with variations in the voltage output of said generator and the other of said machines operating at a speed substantially independent of said variations but variable by variations in the load on said generator.

9. The combination with a generator, of regulating means therefor including a plurality of dynamo electric machines similarly connected in a circuit supplied by said generator and having a speed ratio which is variable by variations in certain of the components of the output of said generator and further including co-operating devices driven by said machines to control the field circuit of said generator for variation of the generator field strength according to the variation in angular relation of said machines.

10. The combination with a generator, of regulating means therefor including a plurality of dynamo electric machines whose speed ratio is variable by variations in the output of said generator and further including co-operating devices driven by said machines to control the field circuit of said generator for variation of the generator field strength proportionally to the variation in angular relation of said machines, said devices functioning to make and break a circuit by unidirectional operation of certain of its contact elements.

In witness whereof, I have hereunto subscribed my name.

FREDERICK L. RE QUA.